US006895083B1

(12) United States Patent
Bers et al.

(10) Patent No.: US 6,895,083 B1
(45) Date of Patent: May 17, 2005

(54) SYSTEM AND METHOD FOR MAXIMUM BENEFIT ROUTING

(75) Inventors: Joshua Bers, Cambridge, MA (US); Patrick M. Peterson, Cambridge, MA (US); John A. Golden, Cambridge, MA (US)

(73) Assignees: Verizon Corporate Services Group Inc., New York, NY (US); BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/847,256

(22) Filed: May 2, 2001

(51) Int. Cl.[7] ............................................. H04M 1/64
(52) U.S. Cl. ........................... 379/88.01; 379/266.02; 704/244
(58) Field of Search .................. 379/88.01, 265.02, 379/265.13, 266.02, 88.02, 88.03, 88.04, 142.01, 142.07, 221.01, 221.02, 221.05, 221.06, 243, 244; 704/240, 244, 9, 249, 251; 707/5

(56) References Cited

U.S. PATENT DOCUMENTS

| | | | | |
|---|---|---|---|---|
| 5,396,536 A | * | 3/1995 | Yudkowsky ................. 379/52 |
| 5,499,288 A | * | 3/1996 | Hunt et al. .............. 379/88.02 |
| 5,625,748 A | * | 4/1997 | McDonough et al. ....... 704/251 |
| 5,794,192 A | * | 8/1998 | Zhao .......................... 704/244 |
| 6,141,411 A | * | 10/2000 | Robinson et al. ...... 379/221.01 |
| 6,233,555 B1 | * | 5/2001 | Parthasarathy et al. ..... 704/249 |
| 6,269,153 B1 | * | 7/2001 | Carpenter et al. ....... 379/88.02 |
| 6,295,533 B2 | * | 9/2001 | Cohen .......................... 707/5 |
| 6,310,947 B1 | * | 10/2001 | Polcyn .................. 379/207.02 |
| 6,330,311 B1 | * | 12/2001 | Mijares et al. ......... 379/112.01 |
| 6,347,139 B1 | * | 2/2002 | Fisher et al. ........... 379/265.12 |
| 6,349,307 B1 | * | 2/2002 | Chen ...................... 707/103 X |
| 6,404,876 B1 | * | 6/2002 | Smith et al. ........... 379/218.01 |
| 6,411,930 B1 | * | 6/2002 | Burges ....................... 704/240 |
| 6,477,240 B1 | * | 11/2002 | Lim et al. ................ 379/88.01 |
| 6,535,600 B1 | * | 3/2003 | Fisher et al. ........... 379/265.02 |

OTHER PUBLICATIONS

John Golden, Owen Kimball, Man–Hung Siu, and Herbert Gish, Automatic Topic Identification for Two–level Call Routing, Proc. ICASSP, vol. I, pp. 509–512, 1999.

John McDonough and Herbert Gish, Issues in Topic Identification on the Switchboard Corpus, Proc. ICSLP, pp. 2163–2166, 1994.

Eric Horvitz, Principles of Mixed–Initiative User Interfaces, Proc. CHI'99, pp. 159–166, Pittsburgh, 1999.

G. Riccardi, A.L. Gorin, A. Ljolje, and M. Riley, A Spoken Language System for Automated Call Routing, Proc. ICASSP, pp. 1143–1146, 1997.

(Continued)

*Primary Examiner*—Roland G. Foster
*Assistant Examiner*—Gerald Gauthier
(74) *Attorney, Agent, or Firm*—Leonard C. Suchyta, Esq.; Joel Wall, Esq.; Rader, Fishman & Grauer

(57) ABSTRACT

A system and method for routing telephone calls is based on identifying caller goals, and maximizing the benefit of routing the call to the appropriate call center. The appropriate call center is identified as the call center best equipped to respond to the needs of the caller. The cost or benefit is based on the fastest and least expensive way to answer a query posed by a caller. A probabilistic model of the caller's goals or call topics based on a response to a top-level prompt is used, along with a set of functions associating a utility or benefit with routing those call topics to destinations within the center. Maximum benefit routing allows for the separation of the caller's goals from those of the call center, thereby optimizing use of available resources.

22 Claims, 5 Drawing Sheets

OTHER PUBLICATIONS

J.H. Wright, A.L. Gorin and G. Riccardi, Automatic Acquisition of Salient Grammar Fragments for Call–type Classification, Proc. Eurospeech, pp. 1419–1422, 1997.

C.–H. Lee, R. Carpenter, W. Chou, J. Chu–Carroll, W. Reichl, A. Saad, and Q. Zhou, A Study on Natural Language Call Routing, IVTTA, pp. 37–42, 1998.

J. McDonough, K. Ng, P. Jeanrenaud, H. Gish, and J.r. Rohlicek, Approaches to Topic Identification on the Switchboard Corpus, Proc. ICASSP, vol. I, pp. 385–388, 1994.

A.L. Gorin, B.A. Parker, R.M. Sachs, and J.G. Wilpon, How May I Help You?, J. Acoust. Soc. Am., vol. 97, pp. 3441–3461, 1995.

Richard O. Duda and Peter E. Hart, Pattern Classification and Scene Analysis, pp. 10–15, John Wiley & Sons, New York, 1973.

Jennifer Chu–Carroll and Bob Carpenter, Dialogue Management in Vector–Based Call Routing, Proc. ACL and Coling, pp. 256–262, 1998.

* cited by examiner

SYSTEM AND METHOD FOR MAXIMUM BENEFIT ROUTING

BACKGROUND OF THE INVENTION

1. Field of the Invention

This invention relates generally to a system and method for maximum benefit routing of telephone inquiries. More particularly, the invention relates to a system and method of routing of telephone calls based on identified caller goals and the cost and/or benefit of routing the call to a customer care call center best equipped to respond to the needs of the caller.

2. Description of the Related Art

Telephonic inquiries have become commonplace, and commercial entities that receive many inquiries use automated systems to answer questions or route the call to an appropriate operator. Commercial entities include telephone companies, cable TV providers, long distance telephone providers, public utilities and credit card companies. In many instances the automated phone system presents the calling party with a self-routing option via touch-tone menus, for example, by asking the caller to select a choice by depressing numbers on the caller's telephone keypad. Sometimes the caller may be confronted with the choice of depressing a number on the keypad or saying the number. The routing system recognizes the tone associated with the depressed number on the keypad, or the vocalized number, and routes the call according to preprogrammed instructions.

These simple routing systems work well when the number of routing choices is below 5. As the number of choices increases, multi-tiered menus become necessary. However, callers generally do not like multi-tiered menus, and may be confused by the choices. Accordingly, the percentage of successful routings decreases as the number of routing choices increases. That is, when faced with a multi-tiered menu system, users frequently have trouble mapping their concerns to the menu choices presented. Thus, callers are less likely to be successfully routed, and in the majority of cases, the call will be either terminated without the caller having received the desired benefit from placing the call or the call will be defaulted to an operator for disposition.

Additionally, self-routing via touch-tone menus can be confusing and dangerous for mobile phone users. The use of mobile phones requires that users focus their visual attention on the handset in order to navigate the phone menu, and not on the driving environment.

Other techniques include using a topic spotter to route the caller based on spoken responses to a general prompt, where a caller is presented with a simple greeting such as "How may I help you?" The caller responds with a natural speech statement of the caller's objective, and the system attempts to classify the caller's request into one of a number of predefined objective routings, or to an operator if the request did not fit one of the predefined routings or if the system was unable to understand the caller's request. These systems have the limitation of only taking into account caller preference, and force fit a caller's preference into one of the predefined routings.

These systems do not take into account the cost or benefits to a call center in maximizing the correct routing of a call. When a call is correctly routed, for example, to the best person qualified to answer the query, or to the call center best equipped to respond to the query, the overall cost to respond to the caller decreases while simultaneously increasing caller satisfaction. Accordingly, there is a need for a maximum benefit routing system and method that allows for the separation of the caller's goals from those of the call center.

SUMMARY OF THE INVENTION

The present invention provides a maximum benefit call routing system that allows for the separation of a caller's goals from the goals of a call center. It also provides a maximum benefit call routing system that allows for the separation of a caller's goals from the goals of a call center to route the call in such a manner as to respond to the caller's query. Moreover, the invention allows for the separation of a caller's goals from the goals of a call center to route the call in such a manner as to respond to the caller's query while minimizing the caller's wait time and maximizing the efficient use of call center resources.

The present invention relates to an automated call routing system that routes a telephone call by responding to a routing objective of a calling party. A speech recognizer determines at least one phrase from a speech utterance made by the calling party and outputs a digital phrase. A topic identifier receives the digital phrase and converts it to at least one of a word stem and a word class and generates a topic output. A maximum benefit router receives the topic output and determines where to route the telephone call in order to optimize at least one predetermined parameter.

The invention provides a maximum benefit routing system that facilitates making changes to the structure of a call center while allowing customer's goals to evolve independently. It also provides a maximum benefit routing system that determines the best destination for a call given the goals of both a caller and a call center.

The present invention is directed to a maximum benefit routing system that routes telephone calls based on the caller's goals and/or the benefit of routing callers to a customer care center most appropriate for retrieving a valid answer for the caller. In general, the cost or benefit is based on the fastest and least expensive way to answer a query posed by a caller. Using a probabilistic model of the caller's goals or call-topics based on a response to a top-level prompt, and a set of functions associating a utility or benefit with routing those call-topics to destinations within the center, the utility or benefit is measured according to a measurable criteria such as agent time saved. The invention selects the destination for each call that will have the maximum expected benefit. Stated simply, for example, when a caller has a question about billing, the call is best routed to a person who has special knowledge about billing, and most likely can answer the billing question in the shortest amount of time. If the billing question was routed to a person having special knowledge about, for example, installation, it most likely would take more time to answer a billing question, and the answer might not be as accurate. In this manner, questions about billing are routed to a person best equipped to answer the question according to the measured criteria, thereby freeing up a specialist that can answer installation questions from another call inquiring about installation.

Maximum benefit routing allows for the separation of the caller's goals from those of the call center. This distinction facilitates making changes to the structure of the call center, for example, new agent queues, interactive voice response functions (IVR), and the like, while allowing customer goals to evolve independently. When making a routing decision, the system determines the best destination given the goals of the caller and the call center.

The approach taken with the inventive system is derived from the decision-theory of minimizing conditional risk described in Pattern Classification and Scene Analysis by Duda and Hart. Bayes decision theory, which is a fundamental statistical approach to the problem of pattern classification, is at least partially interpreted. In decision-theoretic terms, an expected loss is called a risk, and an expected loss associated with the taking of an action is known as a conditional risk. A decision rule is a function of the action taken with a particular observation, which in turn suggests an action to take for every possible observation. To reduce randomness and increase specificity, it can be assumed that for every observation×the action based on the observation assumes one particular action, resulting in the overall risk being the expected loss associated with a given decision rule. When the goal is to make the risk as small as possible, the action to take for the observation can be determined based on these predetermined decision rules. The resulting minimum overall risk is called the Bayes risk and is the best performance that can be achieved. In the system of this invention, the problem to be solved is expressed in terms of maximizing a benefit.

In another embodiment, the call-center can map call-topics into the routing destinations by defining a benefit matrix. For example, the center may define 50 distinct call-topics but have only 7 routing destinations. One advantage of this approach is that it facilitates switching call-centers or domains without the need to re-label data or retrain the probabilistic topic spotter.

In another embodiment, the benefit matrix can associate a high benefit to calls correctly routed to specific destinations while assigning high costs to calls incorrectly routed.

These and other features and advantages of this invention are described in or are apparent from the following detailed description of the preferred embodiments.

BRIEF DESCRIPTION OF THE DRAWINGS

The preferred embodiments of the present invention will be described in detail, with reference to the following figures, wherein.

Throughout the drawing figures, like reference numerals will be understood to refer to like parts and components.

DESCRIPTION OF THE PREFERRED EMBODIMENT

In general, the present invention relates to the routing of telephone calls based on computer interpretation of human dialogue and the benefit achieved to both the caller and the called party when the call is properly routed. The invention relates to the apparatus and methods for operating a computer that processes the dialogue, either digital or analog, to generate another signal that is used to determine the maximum benefit routing, and to route the call based on maximum benefit.

FIG. 1

Figure 1:
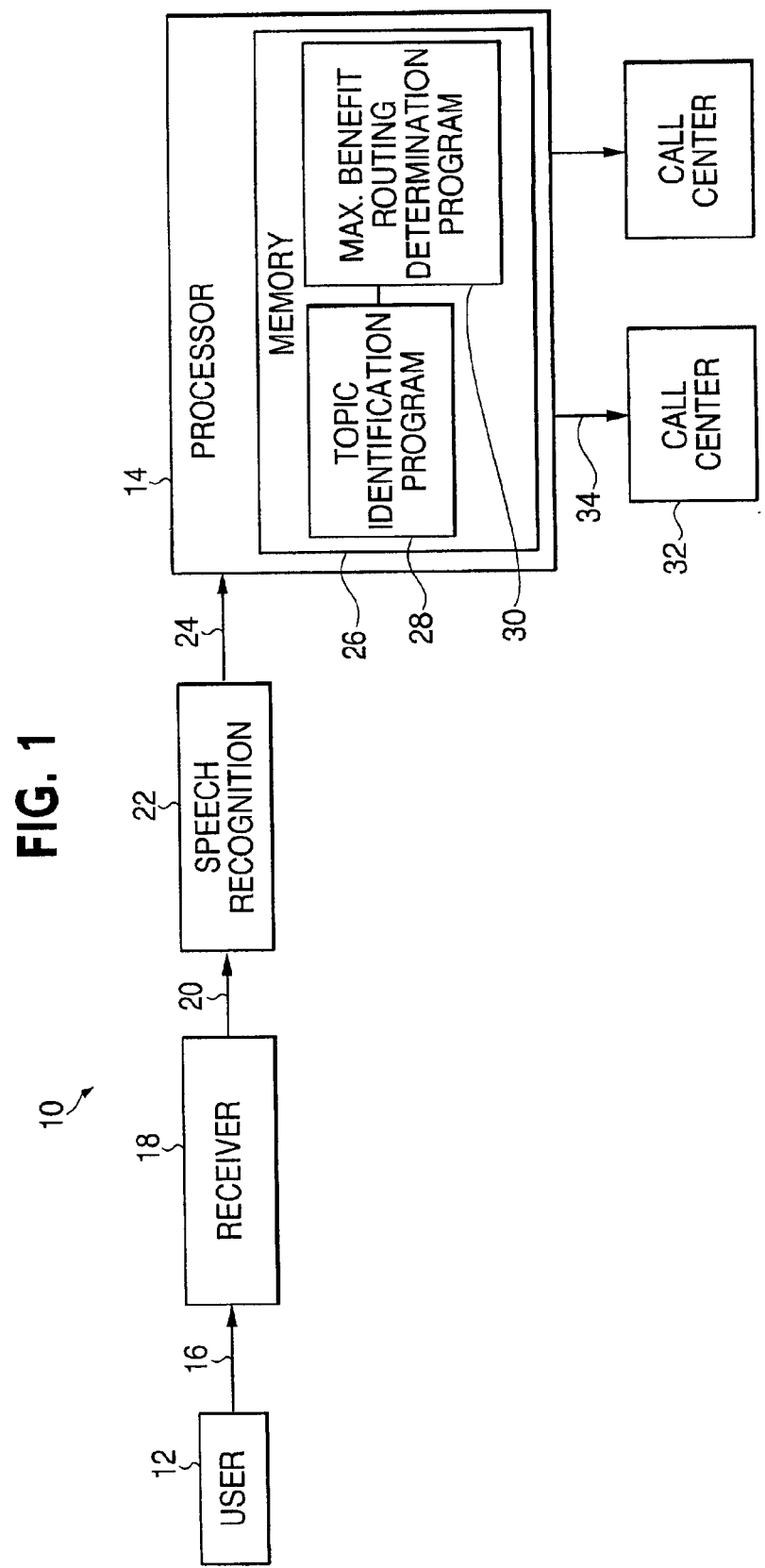
FIG. 1 shows a dialogue processing system in which maximum benefit routing of the present invention can be integrated.

FIG. 1 shows a dialogue processing system 10 in which maximum benefit routing of the present invention can be integrated. Dialogue processing system 10 receives speech utterances 16 when a person 12 transmits to a receiver 18 after a call to a third party using system 10 is connected. It will be understood that speech utterances 16 can be either analog, for example, user 12 talking into a telephone microphone, or they can be digital, for example, typed on a keyboard. Additionally, the speech utterances can be visual, for example, lip reading of a user 12, or the use of hand signals. In this manner, speech utterances 16 can be any dialogue coming from a user 12. Similarly, receiver 18 can be a conventional telephone handset microphone for receiving analog voice and converting the analog voice for electrical transmission, or any other known device, for example a camera, for accepting dialogue from a user 12.

Output 20 from receiver 18 is input to a speech recognition unit 22 for conversion to a usable digital format that can be input 24 to a dialogue processor 14 for dialogue processing. Dialogue processor 14 has a memory 26, a topic identification program 28 stored in memory 26, and a maximum benefit routing determination program 30 stored in memory 26.

Upon determination by the maximum benefit routing determination program 30 of the optimum, or best available routing of the call, user 12 is connected with call center 32 most able to deal appropriately with user 12 query.

Processor 14 is preferably implemented on a general purpose computer. However, processor 14 can also be implemented on a special purpose computer, a programmed microprocessor or microcontroller and peripheral integrated circuit elements, an application specific integrated circuit (ASIC) or other integrated circuit, a digital signal processor, a hard wired electronic or logic circuit such as a discrete element circuit, a programmable logic device such as a programmable logic device (PLD), a programmable logic array (PLA), a field programmable gate array (FPGA) or a programmable array logic device (PAL), or the like. In general, any device, capable of implementing a finite state machine that is in turn capable of implementing the flow charts shown in FIGS. 2–5, can be used to implement a processor 14.

Memory 26 is preferably implemented using static or dynamic random access memory (RAM). However, memory 26 can also be implemented using one or more of static RAM, dynamic RAM, read-only memory (ROM), flash memory, hard disk drive, compact disc read-only memory (CD-ROM) drive, compact disc-readable/writable (CD-RW) drive, Floppy Disk Drive, Network Servers or the like.

As noted above, memory 26 stores topic identification program 28 and maximum benefit routing determination program 30. Topic identification program 28 and maximum benefit routing determination program 30 may be any program capable of implementing their respective portions of the flow charts shown in FIGS. 2–5. Programs 28, 30 can be written in any language compatible with processor 14.

Speech recognition unit 22 can be any speech recognizer known in the art. When spoken words are utilized by a user, a speech recognition unit 22 that provides Spoken Language Understanding (SLU) abilities to applications is preferred. The SLU allows users 12 to express themselves using whatever words they naturally use to have computers intelligently understand their meaning. Speech recognition unit 22 generally provides the necessary SLU components to support speech parsing and conversation management.

Thus, each utterance 16 can be parsed into words or phrases that are indicative of the desire of the user.

In the preferred embodiment, a statistical language model is used to constrain the recognized word sequences. Many speech recognizers and natural language interfaces are known in the art.

Maximum benefit routing determination program 30 generates an output 34 that directs user 12 to one of call centers 32. In this manner, a user 12 is connected with a call center 32 based upon a determination of the best routing of the call based upon utterance 16.

In the preferred embodiment, a call center 32 can be described as having L routing destinations, $d_i$, and N caller topics, $t_j$. Maximum benefit routing determination program 30 takes as input an L×N benefit matrix, B, and an N-dimensional topic-likelihood vector, t, where $$t=P(\text{Topics}|\text{Words}).$$

Maximum benefit routing determination program 30 then generates an L-dimensional vector, b, where $$b=\text{Benefit}(\text{Destinations}|\text{Words}),$$

the expected benefits as output.

The benefit matrix, B, is generated by a person familiar with the costs of handling calls in call center 32. The rows of B represent the destinations for calls, while the columns represent the topics that a caller inquiry may contain. The entries of B define the benefit in seconds of agent time saved by routing to destination $d_i$ when the caller's topic is $t_j$, or benefit$(d_i|t_j)=b_{ij}$.

The caller's topics could be numerous and unwieldy, so a probabilistic topic spotter, or topic identification program 28, is used to generate a topic-likelihood vector, t. The entries for this vector, $t_j$, express the probability that the topic, random variable, t, of the call is $t_j$, given the evidence, $\Pr\{t=t_j|e\}$. Here, the evidence is the string of words, $e=\text{Words}=\text{word}_1, \text{word}_2, \ldots \text{word}_n$, that was recognized by speech recognizer 22 from the caller's response to an open-ended prompt. Maximum benefit routing determination program 30 then calculates an output vector, b=Bt, which contains the expected benefits of routing caller 12 to destinations 32 given their utterance 16, such that $$\text{Benefit}\langle d_i | \text{Words}\rangle = \varepsilon\langle \text{benefit}\langle d_i | t\rangle | \text{Words}\rangle$$
$$= \sum_{j=1}^{N} \text{benefit}\langle d_i | t_j\rangle \Pr\langle t = t_j | \text{Words}\rangle.$$

Maximum benefit routing determination program 30 then chooses the destination that maximizes this sum, or arg max($b_i$), to make the most beneficial routing choice.

FIGS. 2–3

Figure 2:
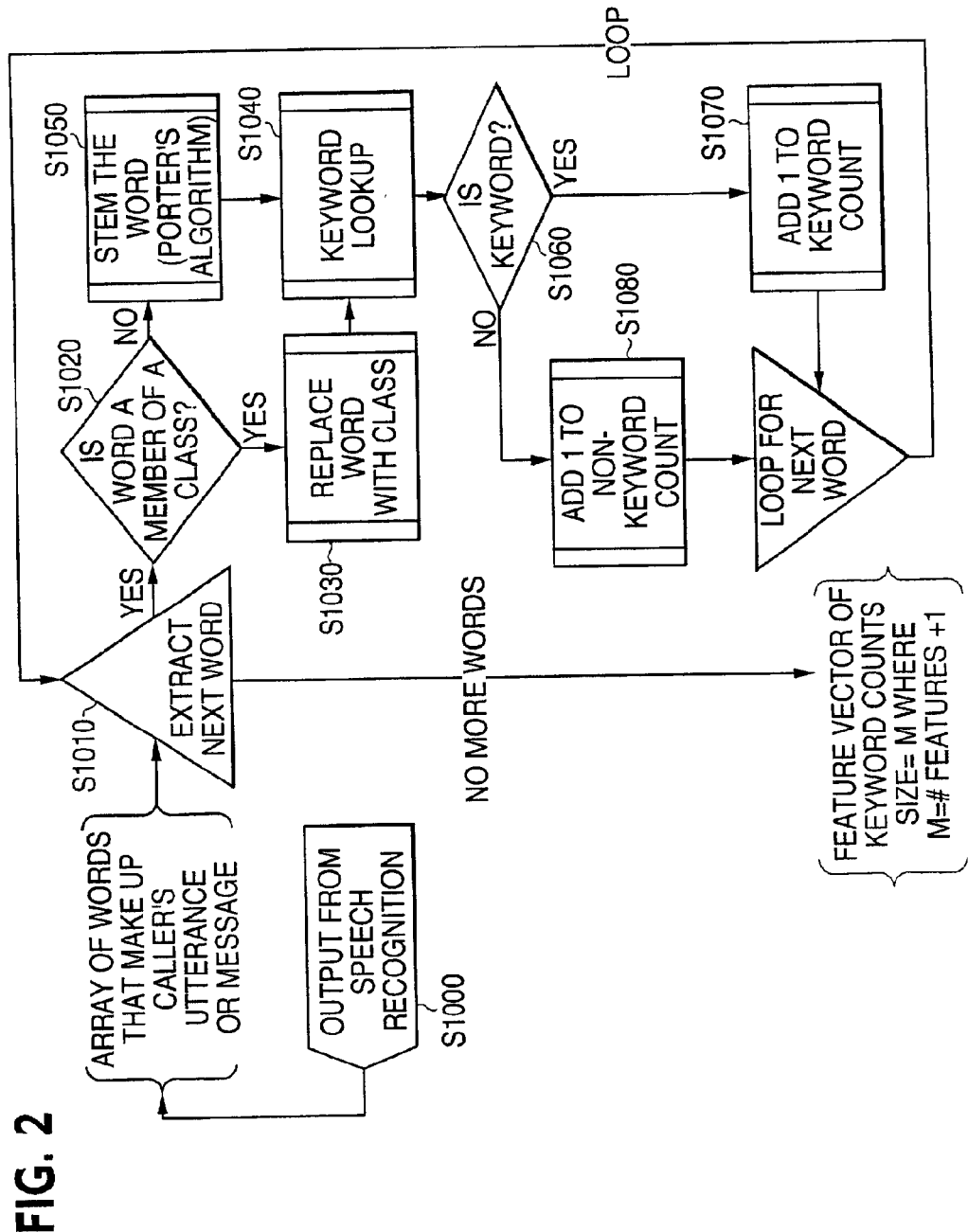
FIGS. 2 and 3 show a topic ID flowchart in accordance with the preferred embodiment of the present invention.
Figure 3:
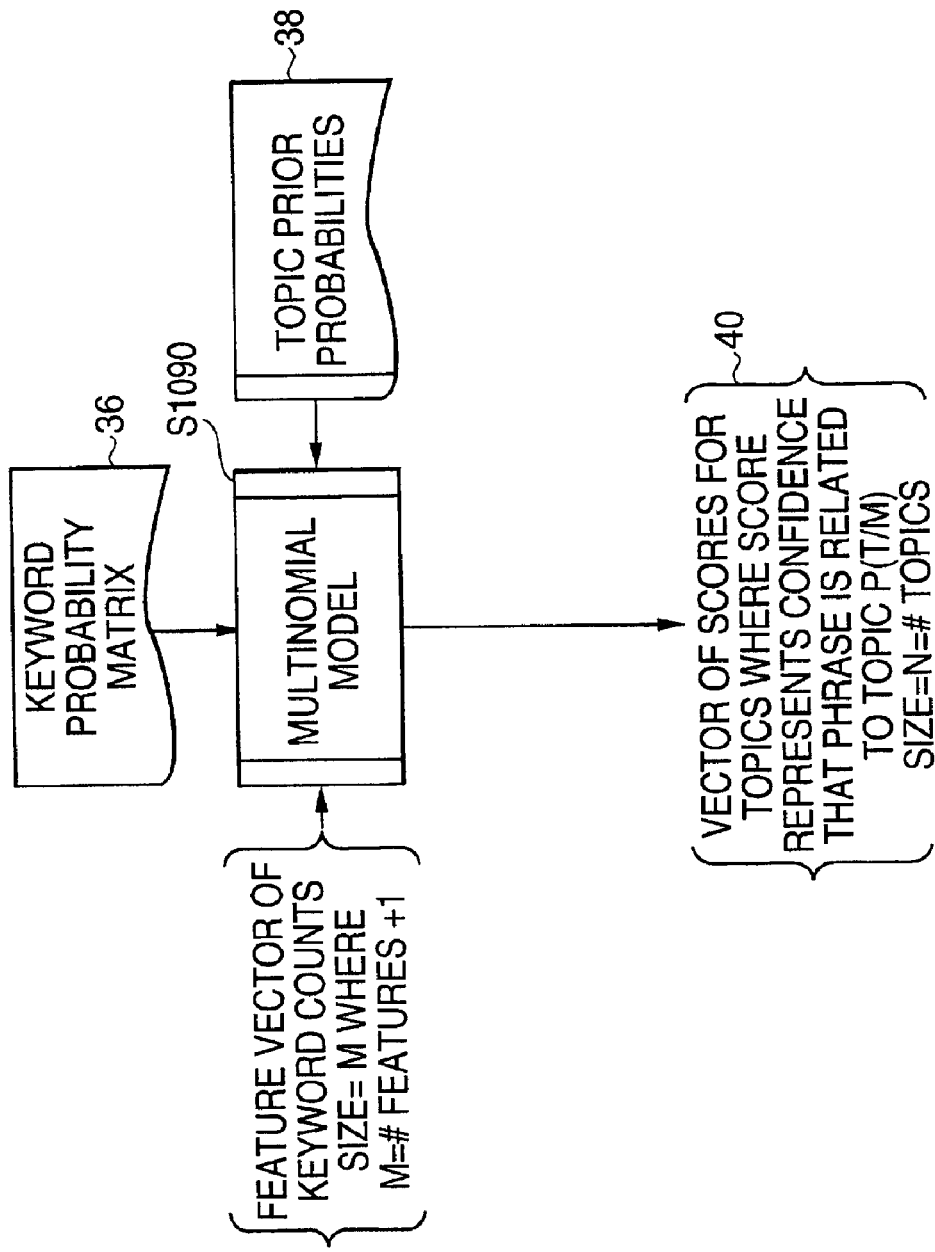

FIGS. 2 and 3 show a topic identification flowchart in accordance with the preferred embodiment of the present invention. The first part of the topic identification takes words output by speech recognizer unit 22 at step S1000 and converts them into word stems or word classes. This is performed by extracting each word from step S1000 in step S1010, and continues to step S1020. In step S1020, it is determined whether the word extracted in step S1010 is a member of a class. If the word in step S1020 is a member of a class, the word is replaced with a class in step S1030, and continues with step S1040. If the word is not a member of a class, the word is stemmed in step S1050, and continues with step S1040.

The stemming in step S1050 can be performed using any known stemming algorithm. In the disclosed embodiment, Porter stemming is used. The Porter stemming algorithm is a process for removing the commoner morphological and inflectional endings from words in the English language. For example, the words connected, connecting, connection and connections can be stemmed to connect. The Porter stemmer was originally described in M. F. Porter, "An Algorithm For Suffix Stripping," Program (Automated Library and Information Systems) 14(3), 130–137, July 1980, which is incorporated herein by reference. The original stemmer was coded in B Combined Programming Language, and has since been rewritten in many other languages, including ANSI C, Java and Perl.

Additionally, in step S1050, some words such as numbers and dates are collapsed into their respective classes. For example, one, two, three can be collapsed into the class "number."

In step S1040, keyword lookup is performed on the word class or stemmed word from steps S1030 and S1050 from a table of keywords. When the keyword lookup is complete in step S1040, the process continues to step S1060. In step S1060, it is determined whether the word class or stemmed word is found in the keyword lookup table. If the word class or stemmed word is found in the keyword lookup table, the process continues to step S1070. In step S1070, 1 is added to the keyword count and the process returns to step S1010 for the next word. If the word class or stemmed word is not found in the keyword lookup table, the process continues to step S1080. In step S1080, 1 is added to the non-keyword count and the process returns to step S1010 for the next word. When there are no more words to be extracted in step S1010, the process continues to step S1090.

In this manner, topic identification program 28 looks up each resulting stemmed word or word class in a table of keywords that make up the features of a multinomial model.

In the multinomial model of topic identification program 28 there are M−1 keywords plus one feature that matches all non-keyword word-stems, making a total of M features. In this manner, topic identification program 28 creates a feature vector of size M that contains the number of times each feature was found in the input message S1000.

Generalized linear models (GLMs) or support vector machines can be used in place of multinomial, or Bayesian, models for topic modeling. However, multinomial models are used in the preferred embodiment. In the following steps, Bayesian decision theory is utilized, where a priori probabilities reflect prior knowledge of how likely an event will occur based on past data. In this embodiment, prior $P(t_j)$ is estimated by the frequency of messages in topic $t_j$ among all messages in a predetermined set of previously recorded live messages. In the case where the data is unavailable, but the a priori probabilities $P(t_j)$ are known, a decision rule must follow. When ancillary data can be determined, a state conditional probability density function can be determined. When the data is observed, Bayes Rule shows how the observed data or evidence, e, changes the a priori probability $P(t_j)$ to the a posteriori probability $P(t_j|e)$. As mentioned above, the evidence is the string of words recognized by speech recognizer 22. For the multinomial model we approximate this word sequence as a sequence of keywords, $e \approx m = w_1, w_2, \ldots w_n$ such that $w_i \in$ Keywords $\forall i$. The keyword distribution $P(w|t_j)$ is estimated by counting frequencies of the keywords in the set of previously recorded messages with true topic $t_j$. If messages have more than one true topic, then a message with at least one of its true topics equal to $t_j$ is used for this distribution.

In step S1090, a multinomial model is performed on the feature vector, and uses a keyword probability matrix 36 and topic prior probabilities 38. Keyword probability matrix 36 and topic prior probabilities 38 may be stored in memory 26 or in a separate database.

The algorithm used in the preferred multinomial model of step S1090 requires that for each topic $t_j$ (j=1, ..., N) and message m, the log posterior probability, log ($P(t_j|m)$) is computed and used as the topic's score. The model is multinomial over keywords $W_1, \ldots, W_M$:

$$\log(P(t_j|m)) = \log\frac{P(t_j)P(m|t_j)}{P(m)} = \log(P(t_j)) + \log\prod_{i=1}^{M} P(w_i|t_j)^{n_i} - \log(P(m))$$

$$= \log(P(t_j)) + \sum_{i=1}^{M} n_i \log(P(w_i|t_j)) - \log(P(m)),$$

where $n_i$ is the number of times keyword $w_i$ appears in m, and P(m), the probability of the message, is given by $$P(m) = \sum_{t_j} P(t_j)P(m|t_j) = \sum_{t_j} \exp\left(\log(P(t_j)) + \sum_{w_i} n_i(\log(P(w_i|t_j)))\right).$$

In the actual computation of P(m) we use a normalization technique to avoid underflow. Because small log-likelihoods will tend to drive the exponential computation towards zero, first we calculate $$t_{\max} = \arg\max_{t_j}(P(m|t_j)),$$

then we can normalize the above by log(0<m|$t_{max}$>) by subtracting it within the exponential and then adding it back in after the summation, $$\log(P(m)) =$$

$$\log\left(\sum_{t_j} \exp\left(\log(P(t_j)) + \sum_{w_i} n_i(\log(P(w_i|t_j)) - \log(P(m|t_{\max})))\right)\right) +$$

$$\log(P(m|t_{\max})).$$

For all likelihoods $P(m|t_j)$ where j=1, ..., N to be comparable, the models $P(w|t_j)$ use the same keywords. This requires that the estimation of $P(w_i|t_j)$ for $w_i$ with zero counts in $t_j$'s training. This is accomplished using, for example, Bell-Witten backoff or other known backoff techniques.

Output 40 from the multinomial model of step S1090 is a vector of posterior possibilities for each topic in the model, $P(t_j|m)$. This output 40 is a vector of scores for topics where each score represents confidence that the message is related to topic P(t|m) and size equals N, which equals the number of topics.

FIG. 4

Figure 4:
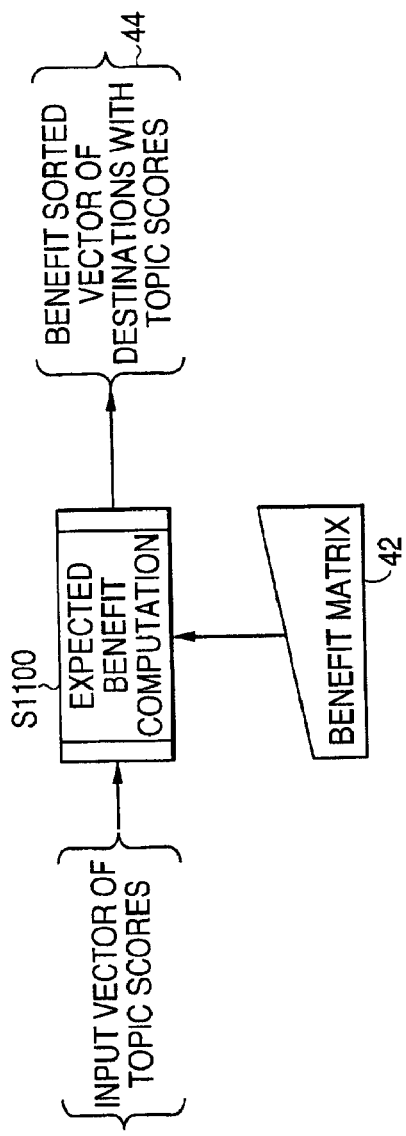
FIG. 4 shows a benefit calculation flowchart in accordance with the preferred embodiment of the invention.

The benefit calculation is shown in FIG. 4. The output of the multinomial model is a vector of posterior probabilities 40 for each topic in the model, that is, $p(t_j|m)$. Vector of posterior probabilities 40, also known as topic scores 40 is input into a benefit calculation at step S1100. The benefit calculation at step S1100 takes these posterior probabilities 40 and weights them by benefits from a benefit matrix 42 to determine the expected benefit of routing the caller to each destination 32. Output 44 from the expected benefit computation of step S1100 is a benefit sorted vector of destinations with topic and benefit scores.

Cost-benefit matrix 42 for benefit analysis is a $(d_1, \ldots, d_L) \times (t_1, \ldots, t_N)$ matrix $B_{ij}$ of "benefits," where $B_{ij}$ is the benefit of routing a message to a destination $d_i$ if its true topic is $t_j$. Given this matrix, the classifier calculates for each message m and topic $t_j$ $$\text{Benefit}(d_i|m) = \sum_{j=1}^{N} (B_{ij})(P(t_j|m))$$

This represents the expected benefit of routing the message to destination j. The classifier outputs the L-dimensional vector b of benefit scores.

In most cases the destinations and the topics are the same, for example, when there is a specific destination associated with each topic. However, the number of destinations and topics need not match. This allows the flexibility of collapsing many topics to a single destination or adding alternate destinations for which no topic exists in the model. For example, it is sometimes useful to have an alternate destination when no topic is suitable. This is also known as a rejection. Selection of this destination usually means that the system would reprompt the caller for additional information. Table 1 depicts an example of a benefit matrix.

TABLE 1

Benefit matrix

| Destinations ($_j$) | Topics ($t_j$) | | | |
|---|---|---|---|---|
| | Account | Balance | Billing | Confirm-payments |
| Account | 40 | −10 | −10 | −10 |
| Balance | 0 | 80 | −10 | 40 |
| Billing | 0 | 0 | 10 | 0 |
| Confirm-payments | −10 | −10 | −10 | 80 |
| Reject | 0 | 0 | 0 | 0 |

The benefit matrix of Table 1 shows the topics $t_j$, the destinations $d_j$, and the benefit in agent-seconds. As discussed above, benefit matrix, B, is generated by a person familiar with the costs of handling calls in call center 32. The rows of B represent the destinations for calls, while the columns represent the topics that a caller inquiry may contain. The entries of B define the benefit in seconds of agent time saved by routing to destination $d_i$ when the caller's topic is $t_j$, or benefit($d_i|t_j$)=$b_{ij}$. A rejection destination row is added for those instances when the destination is indeterminate. Rejection values are set to zero or some very small value since there is no benefit in sending a caller to reject, or back to an operator to determine how to answer a caller's query. By way of example, when the probabilities output from topic identification program 28 are determined to be:

$P_t$={account=0.5, balance=0.4, billing=0.05, confirm-payments=0.05} then the expected benefit of routing to Account destinations is the dot product of the probabilities output, $P_t$, with the Account row, such that the expected benefit score is $\Sigma(0.5 \cdot 40, 0.4 \cdot (-10) 0.05 \cdot (-10) 0.05 \cdot (-10)) = 15$.

In contrast, the expected benefit of routing to Balance is the dot product of $P_t$ with the Balance row, such that the expected benefit score is $\Sigma(0.5 \cdot 0, 0.4 \cdot 80, 0.05 \cdot (-10), 0.05 \cdot 40) = 33.5$.

The higher sum identifies the maximum benefit destination, or balance. As discussed above, the destination that maximizes this sum, or the max over i of $b_t$, is the most beneficial routing choice This example illustrates a case where the maximum benefit destination, Balance, is not the same as the most probable topic, Account. In this manner, the model determines not just the most probable topic, but the maximum benefit destination that will result in the lowest cost.

FIG. 5

Figure 5:
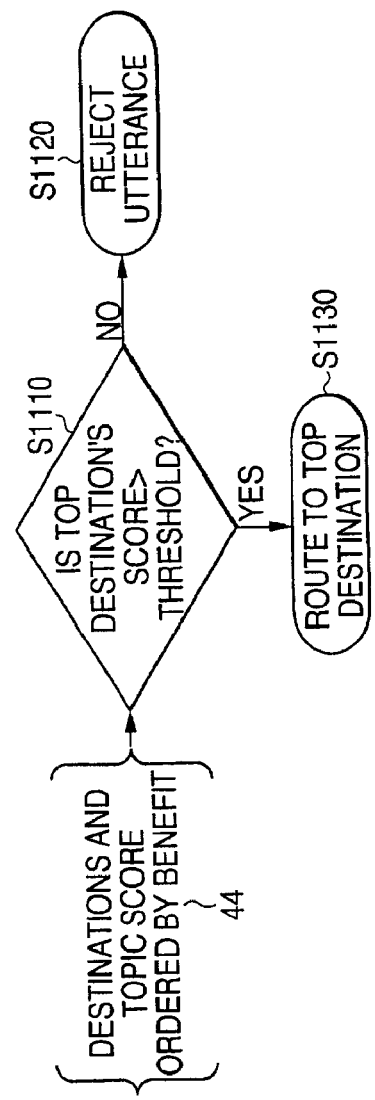
FIG. 5 shows a routing decision flowchart in accordance with the preferred embodiment of the invention.

FIG. 5 shows a flow chart of the routing decision. Input to maximum benefit routing determination program 30 is a sorted vector of destinations ordered by their expected benefit score 44. If the destination is also modeled as a topic in the topic id system, the topic score is also included in the vector. If the destination was not modeled as a topic in the topic id system, then a very small value is used. Maximum benefit routing determination program 30 determines whether to route the call to the top ranking destination or to reject it if the score falls below a predetermined threshold in step S1110. The confidence threshold is determined by plotting the benefit versus the output of the topic id confidence score. The threshold ranges from 0–100, where 100 represents routing only when there is full confidence in the topic. In the preferred embodiment, the confidence threshold is set between 50–80 in order to receive the maximum benefit. If the topic score is below the threshold value, the utterance is rejected in step S1120. If the topic score is greater than the threshold, the utterance is routed to the top destination in step S1130.

Using the example from above, maximum benefit routing determination program 30 would receive a benefit vector, $B_d = \{Balance = \{3.5, 0.4\}, Account = \{15, 0.5\}, reject = \{0, 0.01\}, Confirm = \{-5.5, 0.05\}\}$.

Note that the ranking is based on the benefit calculation but the scores from the topic id output probabilities are also included. Maximum benefit routing determination program 30 would then determine whether to send the caller to the Balance destination if the system confidence threshold was 0.4, or 40% or less, or otherwise reject the utterance, and perhaps reprompting the caller. Other embodiments of the routing decision could use both topic score and destination benefit, e.g., route if topic score is above 40% or if benefit is above 30.

Data Analysis and Experimental Results

Experiments were performed internally to test the effectiveness of the maximum benefit routing approach described above. Data was captured from a large customer care call center that used a wizard-of-oz system to prompt customers, and their response to a routing inquiry, such as, "How may I direct your call?" were recorded. This data was transcribed and each utterance was assigned a topic label from a set of 10 topics. About 5000 utterances were used to train the classification system and another independent set of 1200 utterances were used to create an internal-use only test set that was used to test the dialogue processing system 10.

In collaboration with an internal the call center, a cost-benefit matrix was created that estimated the cost or savings to the call center in agent-seconds of routing calls of various topic types to each of the destinations. Additionally, the cost of a misroute on customer satisfaction was calculated to be equivalent to 10 seconds of agent time. Note that it is difficult to quantify the impact of a misroute on customer satisfaction, or for that matter customer satisfaction on costs. The heuristic used was that a misroute costs the call center ¼ of the cost in agent time to determine the caller's request (40 seconds) or 10 seconds.

FIGS. 6–7

The classification system was then applied to the test set to see where each call was routed. By applying the costs from the benefit matrix to the test results, the average benefit in agent-seconds per call was determined. The first test used the system that routes callers to the most likely topic as determined by the topic identifier. This resulted in a determination that 17.5 agent-seconds were saved per call. The cost benefit matrix was then applied in conjunction with maximum benefit routing determination program 30 to obtain a new routing choice for the test set. This yielded 19.1 agent-seconds saved or a 9% increase in savings per call. The rejection threshold for the system was varied to determine how the benefit would respond. The results from these experiments are illustrated in FIGS. 6 and 7.

Figure 6:
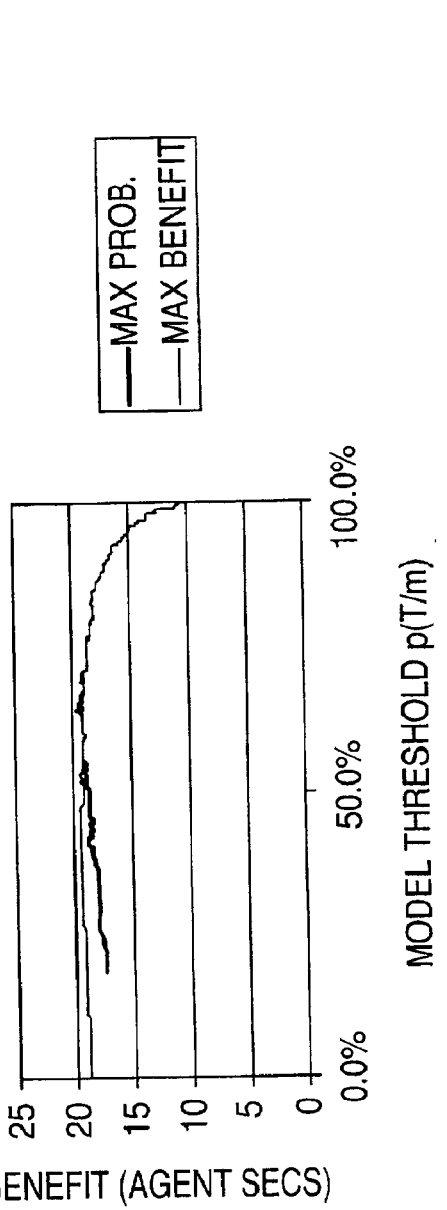
FIGS. 6–7 show results of experimental data of the present invention.
Figure 7:
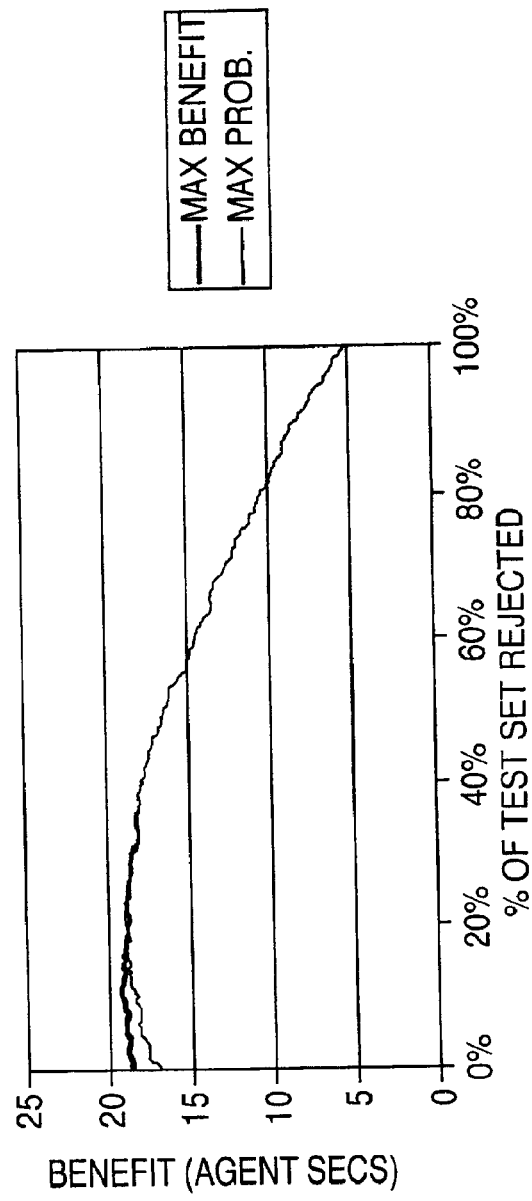

In FIG. 6, it can be seen that as the threshold for accepting the top result from the system is raised beyond the 50% confidence level, the advantage of using the maximum benefit routing diminishes. This indicates that this technique is useful when a routing decision must be made, for example, when rejection has a very high cost or is not available. This might be the case when agents are not available to handle a general call, for example, the rejection queue, or when the cost of waiting for a general agent is prohibitive, for example, very long hold times. FIG. 7 shows the tradeoff between benefit and number of calls rejected.

Running at an operating point optimized for maximum benefit for each system yields 19.4 and 19.6 agent-seconds saved per call respectively or only a 1-% improvement for the maximum benefit system. This indicates that the topics are well matched to the business requirements of the call center. If there was a large discrepancy between the two systems this might indicate that the topics could be remapped to the destinations in a more productive way, or it might mean that the treatment of the calls could be changed such that the benefit matrix is more balanced or "diagonal".

The benefit matrix can also be used to model changing costs within the call center. Benefit matrices for different times of the day or parts of the year where costs change can be defined. Then only the routing system's active benefit matrix requires updating for it to have an impact on routing performance. This is a much less costly process than retraining the topic models or defining new topics.

It will be appreciated by those in the art that the maximum benefit that can be gained by optimizing the routing of a user call can also apply to routing electronic mail messages. For example, if a user 12 sends an electronic message to a public utility, topic identification program 28 can be applied, followed by maximum benefit routing determination program 30. With the use of electronic messages, errors introduced as a result of speech recognition 22 are eliminated. Optimized routing of email inquiries will lead to better, faster and cheap replies.

The benefit matrix can also be used to collapse topics together when there are fewer destinations than topics. This is achieved by building the matrix such that each topic column has a benefit of 1 in the row of the destination where it should be collapsed. If the benefit matrix is made up of only such entries this will cause the benefit calculation to produce the sum of the confidence scores for the topics that collapse into each destination. The result is a maximum likelihood score rather than a maximum benefit score for the destinations.

While the invention has been specifically described in connection with certain specific embodiments thereof, it is to be understood that this is by way of illustration and not of limitation, and the scope of the appended claims should be construed as broadly as the prior art will permit.

What is claimed is:

1. An automated call routing system that routes a telephone call by responding to a routing objective of a calling party, comprising:
    a speech recognizer that determines at least one phrase from a speech utterance made by the calling party and outputs a digital phrase;
    a topic identifier that receives the digital phrase and converts the digital phrase to at least one of a word stem and a word class and generates a topic output; and
    a maximum benefit router that receives the topic output and determines where to route the telephone call in order to optimize at least one predetermined parameter, said telephone call route based on maximum benefit;
    wherein the topic output is a feature vector that contains the number of times the at least one word stems and word classes were found in the determined phrase, and
    wherein the maximum benefit router performs at least one of analyzing the feature vector, outputting a posterior possibilities vector, inputting a posterior possibilities vector and determining the expected benefit of routing the call to each of a predetermined destination, and outputting a benefit sorted vector of destinations, benefits and topic scores.

2. The automated call routing system of claim 1, wherein the maximum benefit router determines the best routing objective of the calling party according to call topics.

3. The automated call routing system of claim 1, wherein the maximum benefit router determines the best routing destination based on the routing objective of the calling party distinguished from a second routing objective of a call center.

4. The automated call routing system of clam 1, wherein the at least one predetermined parameter is selected from an m×n benefit matrix having m rows and n columns forming an m×n matrix and where m represents routing destinations and n represents caller topics.

5. The automated call routing system of claim 1, further comprising a benefit matrix as input to the maximum benefit router, said benefit matrix having at least one routing destination and at least one caller topic.

6. The automated call routing system of claim 1, wherein the topic identifier generates a topic likelihood vector that is input to the maximum benefit router.

7. The automated call routing system of claim 4, wherein entries in the benefit matrix define the benefit in seconds of agent time saved by routing the call to a first destination based upon a first caller topic.

8. The automated call routing system of claim 1, wherein the maximum benefit router routes the telephone call to a first call center based upon at least one of optimized time savings, optimized cost savings, optimized response quality and optimized resources.

9. The automated call routing system of claim 1, wherein the maximum benefit router optimizes at least one predetermined parameter using Bayesian decision theory and determining minimum overall risk.

10. The automated call routing system of claim 9, wherein the minimum overall risk is the maximum benefit.

11. The automated call Touting system of claim 1, wherein the speech recognizer is a spoken language understanding device.

12. The automated call routing system of clam 1, the topic identifier further comprising a stemming algorithm.

13. The automated call routing system of claim 12, wherein the stemming algorithm is Porter Stemming.

14. An automated call routing system that routes a call by responding to a routing objective of a calling party, comprising:
    a recognizer that determines at least one phrase made by the calling party and outputs a second phrase;
    a topic identifier that receives the second phrase and converts the second phrase to at least one of a word stem and a word class and generates a topic output; and
    a maximum benefit router that receives the topic output and determines where to route the call in order to optimize at least one predetermined parameter, said telephone call routed based on maximum benefit;
    wherein the topic output is a feature vector that contains the number of times the at least one word stems and word classes were found in the determined phrase, and
    wherein the maximum benefit router performs at least one of analyzing the feature vector, outputting a posterior possibilities vector, inputting a posterior possibilities vector and determining the expected benefit of routing the call to each of a predetermined destination, and outputting a benefit sorted vector of destinations, benefits and topic scores.

15. The automated call routing system of claim 14, wherein the call can be one of a telephone call aud electronic mail.

16. A method for automatically routing a telephone call using maximum benefit routing, comprising the steps of:
    receiving a telephone call from a caller;
    determining phrases from speech utterances by a caller;
    inputting said determined phrases to a speech recognizer device;
    converting said recognized determined phrases into at least one of word stems and word classes;
    performing keyword lookup on the one of word stems and word classes;
    generating a feature vector that contains the number of times the at least one word stems and word classes were found in the determined phrase;
    performing analysis on the feature vector;
    outputting a posterior possibilities vector;
    inputting the posterior possibilities vector and determining the expected benefit of routing the call to each of a predetermined destination; and
    outputting a benefit sorted vector of destinations, benefits and topic scores.

17. The method of claim 16, wherein the analysis is performed on the feature vector using one of a multinomial model, a generalized linear model and a support vector machine.

18. The method of claim 17, wherein the posterior possibilities vector is a vector of scores for topics, each score representing confidence that the determined phrase is related to a predetermined topic and vector size is the number of topics.

19. The method of claim 16, further comprising the step of:

determining whether to route the call to a top ranking destination or to reject the utterance if the topic score and/or benefit falls below a predetermined threshold.

20. A maximum benefit call routing system for use in a call center that routes a telephone call made by a calling party by responding to a routing objective of the calling party, comprising:

a speech recognizer that determines at least one phrase from a speech utterance made by the calling party and outputs a digital phrase;

a topic identifier that receives the digital phrase and converts the digital phrase to at least one of a word stem and a word class and generates a topic output; and a maximum benefit router that receives the topic output and determines where to route the telephone call in order to optimize at least one predetermined parameter, said telephone call routed based on maximum benefit;

wherein the maximum benefit router determines the best routing objective of the calling party according to call topics, wherein the maximum benefit router determines the best routing destination in the call center based on the routing objective of the calling party distinguished from a second routing objective of the call center, wherein the topic output is a feature vector that contains the number of times the at least one word stems and word classes were found in the determined phrase, and wherein the maximum benefit router performs at least one of analyzing the feature vector, outputting a posterior possibilities vector, inputting a posterior possibilities vector and determining the expected benefit of routing the call to each of a predetermined destination, and outputting a benefit sorted vector of destinations, benefits and topic scores.

21. An automated call routing system for use in a call center that routes a call by responding to a routing objective of a calling party, comprising:

a recognizer that determines at least one phrase made by the calling party and outputs a second phrase;

a topic identifier that receives the second phrase and converts the second phrase to at least one of a word stem and a word class and generates a topic output; and a maximum benefit router that receives the topic output and determines where to route the call in order to optimize at least one predetermined parameter, said telephone call routed based on maximum benefit, wherein the maximum benefit router determines the best routing objective of the calling party according to call topics, wherein the maximum benefit router determines the best routing destination in the call center based on the touting objective of the calling party distinguished from a second routing objective of the call center, wherein the topic output is a feature vector that contains the number of times the at least one word stems and work classes were found in the determined phrase, and wherein the maximum benefit router performs at least one of analyzing the feature vector, outputting a posterior possibilities vector, inputting a posterior possibilities vector and determining the expected benefit of routing the call to each of a predetermined destination, and outputting a benefit sorted vector of destinations, benefits and topic scores.

22. A method for automatically routing a telephone call in a call center using maximum benefit routing, comprising the steps of:

receiving a telephone call from a caller, determining phrases from speech utterances by a caller, inputting said determined phrases to a speech recognizer device;

converting said recognized determined phrases into at least one of word stems and word classes;

performing keyword lookup on the one of word stems and word classes;

generating a feature vector that contains the number of times the at least one word stems and word classes were found in the determined phase;

performing analysis on the feature vector, outputting a posterior possibilities vector, inputting the posterior possibilities vector and determining the expected benefit of routing the call to each of a predetermined destination;

outputting a benefit sorted vector of destinations, benefits and topic scores;

inputting the benefit sorted vector and comparing a top ranking destination to a predetermined threshold;

routing the received telephone call to a call center operator if the top ranking destination exceeds the predetermined threshold.

* * * * *